C. E. BEACH.
CONTROLLING SYSTEM FOR STORAGE BATTERIES.
APPLICATION FILED FEB. 11, 1920.
1,396,242.
Patented Nov. 8, 1921.
2 SHEETS—SHEET 1.
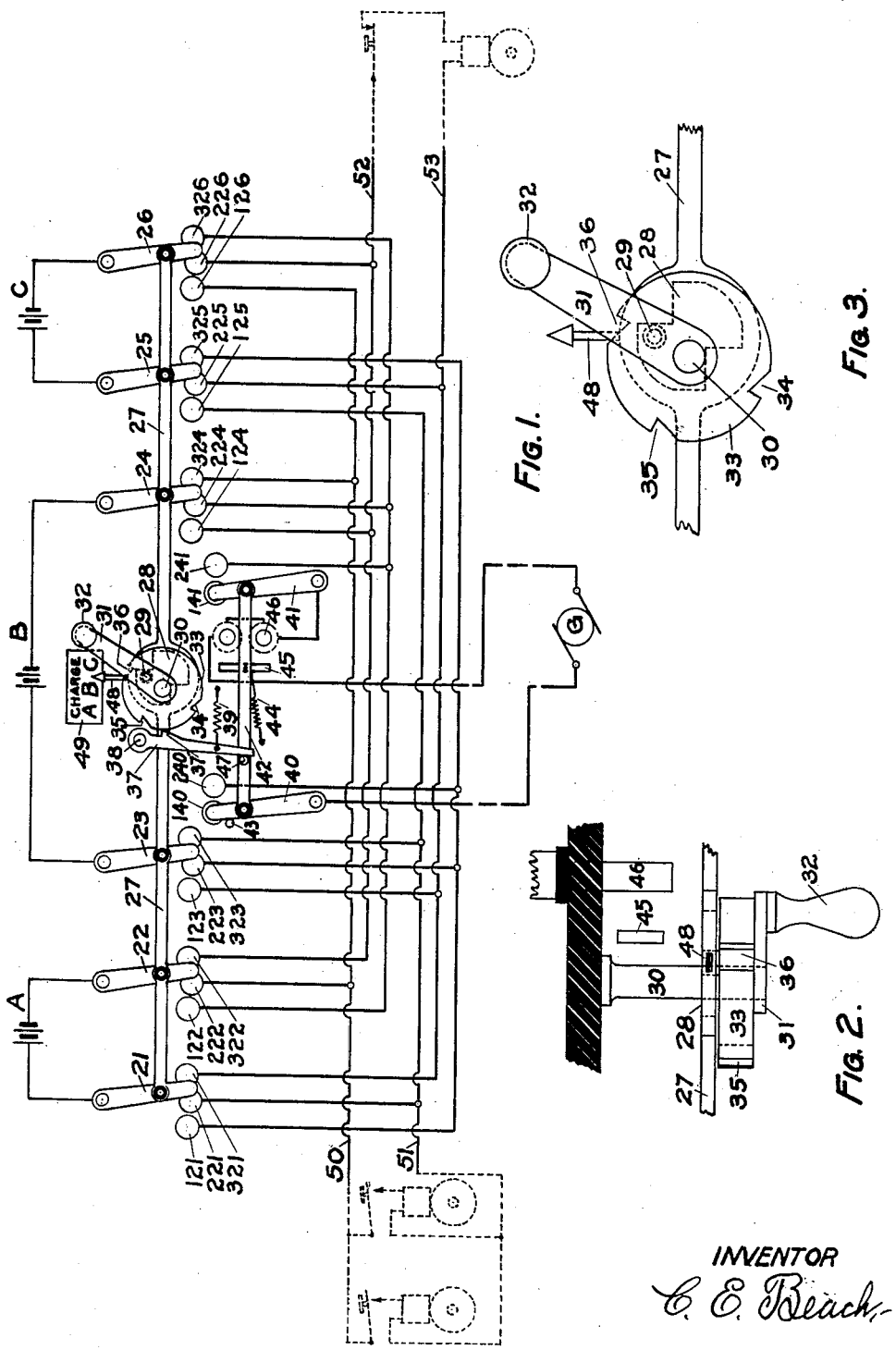
INVENTOR
C. E. Beach C. E. BEACH.
CONTROLLING SYSTEM FOR STORAGE BATTERIES.
APPLICATION FILED FEB. 11, 1920.

1,396,242.

Patented Nov. 8, 1921.
2 SHEETS—SHEET 2.

INVENTOR
C. E. Beach

UNITED STATES PATENT OFFICE.

CLARENCE E. BEACH, OF BINGHAMTON, NEW YORK.

CONTROLLING SYSTEM FOR STORAGE BATTERIES.

1,396,242.  Specification of Letters Patent.  Patented Nov. 8, 1921.

Application filed February 11, 1920. Serial No. 357,789.

*To all whom it may concern:*

Be it known that I, CLARENCE E. BEACH, a citizen of the United States, residing at Binghamton, county of Broome, and State of New York, have invented certain new and useful Improvements in Controlling Systems for Storage Batteries, of which the following is a specification.

This invention relates to the controlling of storage batteries in connection with signaling circuits, and is particularly adapted for use when three storage batteries are each to be connected in alternation to a source of charging current and to one and the other of two different types or classes of discharge circuit.

Occasions for the use of this invention arise under various circumstances such as, for example, in combination night watch and fire alarm or burglar alarm central stations, where a current source is required for supplying one or more normally closed current paths and an independent source is required for supplying a corresponding one or more normally open paths. If storage batteries are employed under such circumstances, it is evident that the battery or batteries supplying normally closed current paths will become discharged in a shorter time than those supplying normally open current paths; and that, if both are recharged upon occasions of corresponding frequency, such closed circuit batteries will require greater recharge, as to either or both of the factors of current intensity and period of charge, than the batteries which have been connected to normally open current paths. In battery plants, such as those just referred to, it is usually inadvisable to charge the various batteries while they are discharging, and it has therefore become common practice to provide duplicate batteries, so that one battery may be charged while another corresponding battery is discharged. When several of such batteries are simultaneously charged, it is customary to connect them in one or more series groups in order to more economically utilize the electromotive force of the available charging current source; the voltages of such individual batteries usually being less than one-half of ordinarily available charging current source potentials. It is therefore evident that it will involve considerable inconvenience, undesirable complications and inefficiency if batteries adapted for connection in series during charge, require application thereto of charging current of different strengths or for various periods of time.

It is frequently found to be difficult to determine the amount of discharge to which a battery connected to normally open paths has been subjected, because of the great influence of differing service conditions upon the degree of discharge attained by such a battery during comparatively short periods. It has also been observed that storage battery electrodes of one polarity lose their charge more rapidly than those of the other polarity while standing on open circuit, so that it becomes necessary to overcharge the electrodes of one polarity in order to replace loss of charge in electrodes of the other polarity when cells have stood on open circuit for long periods. For these reasons, such batteries are artificially discharged in many instances, before attempting to recharge them, in order to enable the plates of opposite polarity to be more uniformly discharged.

For reasons which are well understood by those skilled in this art, conditions frequently arise under which it is objectionable to establish a current path between a charging current source and working circuits. It is likewise undesirable that there shall be any interruption of the continuity of working circuits during transposition of the batteries which supply them. For these reasons, it is desirable that, during such transpositions, charging current sources shall be disconnected from such batteries before working circuits are connected thereto, and that working circuits shall be connected to fresh batteries, before being disconnected from batteries which have been supplying them.

An object of this invention is to provide a controlling system for storage batteries whereby a plurality of such batteries may be utilized for independently supplying normally open or normally closed current paths, and whereby each such battery may be periodically recharged to an extent which is uniform for all of such batteries, without thereby either over or under charging any one of them.

Another object of this invention is to provide such a system whereby but one duplicate or reserve battery will be required for recharging purposes for each two independently discharging batteries.

Another object of this invention is to provide such a system so arranged that it will be impossible to connect the charging source to any battery during the connection of any discharge circuit thereto.

Other objects of this invention will be in part obvious and in part specifically mentioned in the following specification.

This invention consists of certain features of construction and arrangement of parts which will be hereinafter described and more particularly pointed out in the claims.

Like reference characters denote similar parts in the accompanying drawing, in which—

Figure 1 is a diagrammatic representation of a system embodying this invention,

Fig. 2 is an enlarged plan view of certain details of the structure shown in Fig. 1, Fig. 3 is an elevation of Fig. 2.

Figure 4:
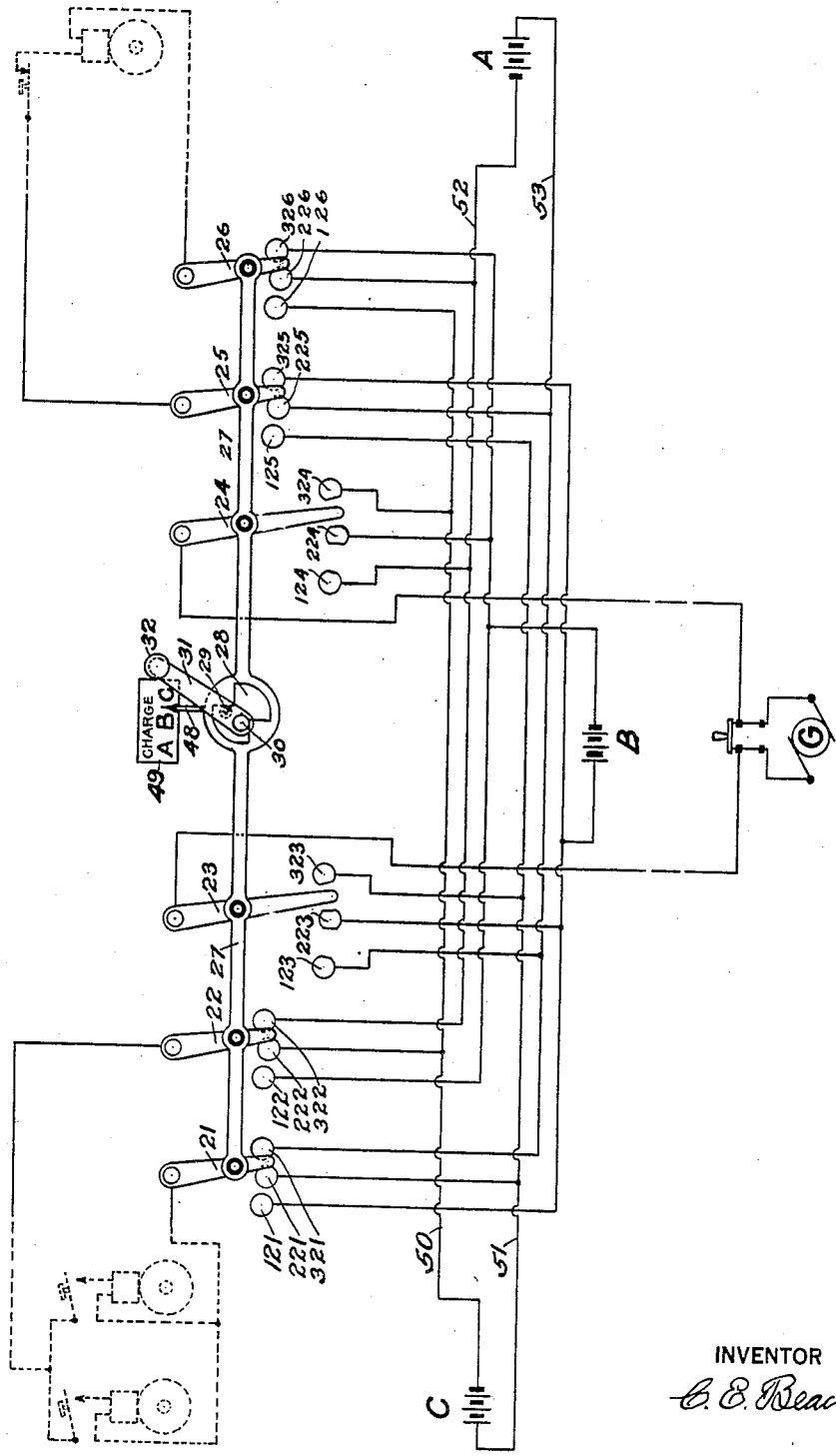
Fig. 4 is a diagrammatic representation similar to Fig. 1 of another embodiment of this invention.

Referring to Fig. 1, the switch arms 21 and 22 are connected through suitable conductors to the respective terminals of the battery A, the switch arms 23 and 24 are similarly connected to the terminals of battery B, and the switch arms 25 and 26 are similarly connected to the terminals of battery C.

The contacts 121, 221 and 321 are mounted in suitable relation to the switch arm 21, so that said arm will be brought into successive engagement therewith during the movement of said arm; the relative form and positioning of said contacts and arm being such that, during the movement of such arm from one to another of said contacts, said arm will not break its connection with any one of said contacts until after it has established a connection with another of said contacts. The contacts 122, 222 and 322; 123, 223 and 323; 124, 224 and 324; 125, 225 and 325; 126, 226 and 326 are similarly arranged with relation to the switch arms 22, 23, 24, 25 and 26, respectively. Such arms and contacts therefore constitute three-position switches.

A bar 27 mechanically connects the switch arms 21 to 26 inclusive to concurrently actuate and correspondingly position said switches but does not establish any electrical connection therebetween; the central portion of the bar 27 being so formed as to provide an angular opening 28. A roller 29, carried by the crank 31, projects into the opening 28 to suitably engage the walls thereof so that, by the rotation of said crank 31 the switch arms 21 to 26 inclusive may be conveniently moved from one to another of their associated contacts; the crank 31 carrying the handle 32 being secured to the shaft 30 for the manual actuation thereof.

The disk 33 is secured to the shaft 30 for rotation therewith, the periphery of said disk having formed therein the notches 34, 35 and 36, which notches will be hereinafter more fully described.

The pawl 37 is pivoted at 38 and carries the follower 37', which is held against the periphery of the disk 33 by the spring 39; said follower being so formed as to be adapted to suitably engage the notches 34, 35 and 36 so as to prevent counter clockwise rotation of said disk; notch 34 being so positioned with relation to the roller 29 as to be disposed in the path of the follower 37' when said roller 29 has acted to move the bar 27 to its extreme right-hand position; the notch 36 being disposed in the path of said follower when said roller 29 has acted to move the bar 27 to its extreme left-hand position; and the notch 35 is situated midway between the notches 34 and 36 in that portion of the periphery of the disk 33 which is presented to the follower 37' during clockwise rotation of said disk carrying the notch 36 away from said follower.

The force of the spring 39 is so proportioned to the formation of the notches 34, 35 and 36 and to the follower 37' that, when said follower rests in any one of said notches, the disk 33 and parts moving therewith will be held against accidental displacement, and against such rotation as might otherwise result from the unbalanced condition of said structure when the crank 31 is in a horizontal position.

The switch arms 40 and 41 are mechanically connected by the yoke 42, so that said arms will move in unison, but are not thereby electrically connected. The contacts 140 and 240 are mounted in coöperative relation with the switch arm 40, and the contacts 141 and 241 are similarly mounted with relation to the switch arm 41.

The stop 43 is provided for limiting movement of the arms 40 and 41 in the direction of the contacts 140 and 141 from the contacts 240 and 241; a tendency for such movement being constantly imparted to said arms by the spring 44 acting through the yoke 42.

An armature 45 is secured to the yoke 42; the poles of the electro-magnet 46 being mounted in the path of the armature 45 (see Fig. 2) so that when the arms 40 and 41 are engaging the contacts 240 and 241 respectively, said armature will rest against the poles of said magnet; and said magnet 46 is adapted, when the windings thereof are excited by the passage therethrough of the intended charging current, to hold said armature 45 in engagement therewith against the tendency of the spring 44, and thereby retain the arms 40 and 41 in engagement with the contacts 240 and 241 respectively. Said contacts 240 and 241, switch arms 40 and 41, yoke 42, spring 44, armature 45 and magnet 46 therefore coöperatively serve as an under-load circuit-breaker.

A projection 47 carried by the yoke 42 extends in the path of the pawl 37, said projection being so positioned that, when the follower 37' is supported by the periphery of the disk 33 said projection will prevent such movement of the yoke 42 as would permit the switch arms 40 and 41 to touch their respective coöperating contacts 240 and 241. The depth of the notches 34, 35 and 36 is such as to permit such movement of the pawl 37, in response to the spring 39, as will permit the yoke 42 to carry the armature 45 into engagement with the poles of the magnet 46.

The arms 40 and 41 are connected, by means of suitable conductors, with a source of charging current, such as, for example, the generator G; the windings of the electromagnet 46 forming part of one of said conductors.

The contact 240 is connected through a system of suitable conductors to the contacts 121, 223 and 325; and the contact 241 is similarly connected to the contacts 122, 224 and 326.

The conductors 50 and 51 are adapted to form parts of a suitable discharging current path or paths, and the conductors 52 and 53 are adapted to form parts of a similar path or paths; the conductor 50 being connected to the contacts 222, 324 and 126; the conductor 51 being connected to the contacts 221, 323 and 125; the conductor 52 being connected to the contacts 322, 124 and 226; and the conductor 53 being connected to the contacts 321, 123 and 225.

The pointer 48 and plate 49 form indicating means for disclosing the relationships, afforded by the various positions of the bar 27, between the charging current source and the batteries A, B or C. It is evident that such plate may bear suitable markings for likewise disclosing the relationships between the circuit supplied by the conductors 50 and 51, the circuit supplied by the conductors 52 and 53, or both of such circuits, and the respective batteries.

Although but three batteries and one pair of discharging current paths are shown in the accompanying drawing and herein described, it is evident that corresponding triplicate battery groups may be arranged to similarly supply additional pairs of current paths, in any given system, by correspondingly extending the bar 27 and connecting thereto additional groups of similar switches for like coöperation with corresponding contacts.

Should it be desired to dispense with the use of an underload circuit-breaker, without thereby permitting, during transpositions, the development of interconnections between the charging source and the working circuits; or if, for any other reasons, reversal of the battery and working circuit relations to the three-position switches 21 to 26 inclusive is desired, the arrangement shown by the accompanying drawing may be varied by connecting the terminals of two of the batteries to the conductors 50, 51, 52 and 53; and by disconnecting the conductors shown as leading from the contacts 240 and 241, and connecting said conductors to the third battery. If the batteries are thus connected to the contacts of switches, such as those shown in the accompanying drawing, the discharge paths should be connected to two pairs of the switch arms, as, for example, the arms 21 and 22, and the arms 25 and 26; and the charge path contacts 240 and 241 should be connected to the remaining pair of arms, as, for example, to the arms 23 and 24 respectively. The contacts which coöperate with the switch arms connected to the contacts 240 and 241, as just described, should be so cut away that, during the movement of such arms, the connection will be broken from one of said contacts before it is established with another; and the arrangement of all of such switch arms and their associated contacts should be such that the switch arms which are connected with the contacts 240 and 241 will not, at any time, touch any contact communicating with any battery either terminal of which is connected with any contact then engaged by a switch arm of any other pair.

Such a variation in arrangement is indicated by Fig. 4, in which the terminals of battery A are shown connected to the conductors 52 and 53; the terminals of battery B are shown connected to the contacts 121, 223 and 325, and the contacts 122, 224 and 326; and the terminals of battery C are shown connected to the conductors 50 and 51.

It will be noted that the arrangement shown by Fig. 4 is such that, during movement of the switch arms from one contact to another, the arms 21, 22, 25 and 26 retain electrical connections with one set of their respective associated contacts until they have established connections with another set of such contacts, while the reverse is true of the arms 23 and 24 which are connected to the charging source or generator G. The contacts 123, 223, 323, 124, 224 and 324 are spaced with relation to the free ends of the arms 23 and 24 so that, during movement of said arms from one to another of the contacts respectively associated therewith, each of said arms will move out of engagement with the contact it had previously engaged before any of the other arms moved by the bar 27 have reached a point in their travel where they have established connections with contacts other than those engaged prior to the commencement of such movement; and so that, after the arms 23 and 24 have thus disengaged one set of their contacts, neither of said arms will engage any other of its associated contacts while any of the other arms connected by the bar 27 are positioned to establish a connection with more than one of its associated contacts.

In the use of the embodiment of this invention shown by Fig. 1, the current path or paths supplied by the conductors 50 and 51, and the path or paths supplied by the conductors 52 and 53, should be adapted for connection to current sources of like electromotive force; and the storage batteries A, B and C should comprise like numbers of similar cells, so that the electromotive forces of said respective batteries will be substantially alike. A charging current source G is so arranged that, if connected to any one of the batteries A, B or C, said source will supply suitable charging current thereto.

If the notch 36 is disposed in the path of the follower 37', the crank 31 will extend to the left and substantially parallel to the bar 27, and the switch arms 21 to 26 inclusive will be in their respective extreme left-hand positions, the battery A will be conditioned for charging (as disclosed by the position of the pointer 48 with relation to the marking of the plate 49); the battery B will be connected to supply the current paths dependent upon conductors 52 and 53; and the battery C will be correspondingly connected to the conductors 50 and 51. The follower 37' will be resting in the notch 36, and will consequently permit movement of the yoke 42 toward the right such as will bring the armature 45 against the poles of the electro-magnet 46, and will bring the switch arms 40 and 41 into engagement with the contacts 240 and 241, before bringing the projection 47 against said pawl 37. If the yoke 42 is so moved to the right, charging current will be supplied to the battery A, thereby energizing the electro-magnet 46, which will act through the armature 45 to prevent movement of the yoke 42 in response to the spring 44.

After such an application of charging current to the battery A, should the source of charging current fail or become insufficient to effectively excite the electro-magnet 46, the spring 44 will move the switch arms 40 and 41 away from the contacts 240 and 241 respectively, and thereby automatically prevent discharge of the battery A into the charging circuit.

When the battery A has been sufficiently charged, the charging source may be disconnected therefrom by slightly raising the handle 32, so as to withdraw the notch 36 from the path of the follower 37', and thus force said follower to the periphery of the disk 33. The movement thus imparted to said follower will be transmitted through pawl 37 to the projection 47 and bar 42 so as to withdraw the switch arms 40 and 41 from their respective coöperating contacts 240 and 241; thus discontinuing the flow of charging current into the battery A and thereby deënergizing the electro-magnet 46.

Assuming that the current paths supplied through the conductors 50 and 51 are normally open so that they permit a comparatively small drain upon the battery connected therewith; and that the current path or paths supplied through the conductors 52 and 53 are normally closed, and provide a comparatively large drain upon the battery connected therewith in any corresponding period, it is evident that the battery B will discharge with greater rapidity than the battery C. It is therefore desirable that, after any given battery has been utilized for a convenient period (say, for example, one day) in supplying such low drain current paths, such battery shall be connected for a like period to a current path which will discharge it more rapidly, and that such battery shall be thereupon recharged.

The use of this invention enables each of the various batteries to be subjected to such a sequence of low and high discharge rate periods, followed by a suitable charging period; connecting each discharge path, and the recharge path, to one after another of the batteries in the order of a predetermined sequence; as will be hereinafter more fully explained.

When it is desired to recharge the battery B, the crank 31 should be moved from its left-hand horizontal position to its upright position, thus bringing the notch 35 in the path of the follower 37', moving the switch arms 21 to 26 inclusive to their respective intermediate contacts, and bringing the pointer 48 to register with the letter "B" of the plate 49; and the arms 40 and 41 should be moved into engagement with the contacts 240 and 241 respectively, bringing the armature 45 against the poles of the magnet 46.

The freshly charged battery A will now be connected to conductors 50 and 51, the substantially discharged battery B will be connected to the generator G for recharging, the battery C, which has been subjected to comparatively little discharge while connected to the conductors 50 and 51, will now be connected to the conductors 52 and 53, so as to discharge more rapidly.

After the battery B has been sufficiently recharged, it may be either held in reserve or placed in service; the charging current being, in either event, disconnected therefrom.

When it is desired to charge battery C, the crank 31 is moved from its upright to its right-hand horizontal position thus transferring each of the switch arms 21 to 26 inclusive from its intermediate contact to its right-hand contact. The battery C is thus adapted for connection through the switch arms 40 and 41 to the generator G to be suitably recharged thereby, the battery B being connected to the conductors 50 and 51 and the battery A being connected to the conductors 52 and 53. When it is now desired to again charge the battery A the crank 31 is turned clockwise from its right-hand horizontal position to the left-hand horizontal position thereof with the results hereinbefore more fully described.

From the foregoing it is evident that, with the system shown by the accompanying drawing and herein described, each battery is first conditioned for connection to the charging current, then connected to a path through which the discharge of such battery will be comparatively slow, and then connected to a path through which such discharge will be comparatively rapid. With such a system, it is evident that battery transpositions for all circuits are simultaneously accomplished and that if the intervals between such transpositions are substantially uniform, the rate and period of required charge will always be substantially the same, and that all of the batteries will be correspondingly discharged between charging periods. It is also evident that three batteries will, in accordance with this system, provide service for which four batteries have heretofore been employed.

It is believed that the operation of this invention will be fully understood by those skilled in this art, without further description thereof; and that it will be apparent, from the foregoing, that changes may be made, involving additions or omissions of parts or differences in form and arrangement of parts, without departing from the spirit of this invention.

What I claim and desire to secure by Letters Patent of the United States is:

1. A system comprising two current paths, independent current sources for said paths, respectively, and a reserve current source; in combination with controlling mechanism for simultaneously transferring each of said paths from one to another of said sources.

2. A system comprising two current paths, independent current sources for said paths, respectively, and a reserve current source; in combination with controlling mechanism for simultaneously transferring each of said paths from one to another of said sources, such mechanism being so constructed and arranged that said sources and paths will be connected in parallel during such transfers.

3. Three secondary batteries, two discharge paths, one charge path, and means for connecting said batteries and paths, each with any, respectively, said means being so constructed and arranged that no connection will be established between either of said discharge paths and said charge path incident to the operation of said means.

4. Three secondary batteries, two discharge paths, one charge path, means constructed and arranged for interconnecting respective ones of said paths and batteries, each with any, only in a predetermined sequence and to prevent interconnection through said means between said charge path and either of said discharge paths.

5. Three secondary batteries; two discharge paths; one charge path; and means for respectively connecting said batteries and paths and for transferring such connections, from each to any, respectively, said means being so constructed and arranged that transfers of each of said paths from battery to battery will be accomplished only in the order of a predetermined sequence.

6. Three secondary batteries; two discharge paths; one charge path; means for respectively connecting said batteries and paths, said means being operable to transfer said connections, from each to any, respectively; and an underload circuit-breaker in said charge path responsive to the operation of said means.

7. Three secondary batteries; two discharge paths; one charge path; means for respectively connecting said batteries and paths and for transferring such connections, from each to any, respectively; an underload circuit-breaker for said charge path; and a member operable by said means to hold said circuit-breaker open during such transfers.

8. Three secondary batteries, two discharge paths, one charge path, and means for respectively connecting said batteries and paths and for transferring such connections, from each to any, respectively, without thereby interrupting either of said discharge paths or interconnecting either of such paths with the charge path.

9. Three storage batteries, two discharge paths, one charge path, three three-position switches, and connections from said switches to said batteries and paths whereby said switches may connect said batteries and paths, each with any, respectively.

10. Three storage batteries, two discharge paths, one charge path, three three-position switches, and connections between said switches and said batteries and paths whereby said switches may connect said batteries and paths, each with any, respectively, and transfer such connection without thereby interrupting the continuity of either of said discharge paths.

11. Three storage batteries; two discharge paths; one charge path; three three-position swtches; operating means arranged to concurrently actuate and correspondingly position said switches; and conductors so arranged that, while said switches occupy any one of said three positions, each battery will be connected to a different one of said paths, and so that, by suitable actuation of said switches, any battery may be connected to any one of said paths.

12. Three storage batteries: two discharge paths: one charge path: three three-position switches: operating means arranged to concurrently actuate and correspondingly position said switches: and conductors so arranged that, while said switches occupy any one of said three positions, each battery will be connected to a different one of said paths, and so that, by suitable actuation of said switches, any battery may be connected to any one of said paths; said switches being so arranged relatively to said operating means and to one another that the continuity of said discharge paths will not be interrupted during actuation thereof.

13. Three storage batteries: two discharge paths: one charge path: three three-position switches: operating means arranged to concurrently actuate and correspondingly position said switches: and conductors so arranged that, while said switches occupy any one of said three positions, each battery will be connected to a different one of said paths, and so that, by suitable actuation of said switches, said batteries and paths may be connected, each to any, respectively; said switches being so arranged relatively to said operating means and to one another that, during actuation thereof, such interconnections will be established, between different batteries and between different paths, as to avoid any interruption of the continuity of either of said discharge paths.

14. Three storage batteries: two discharge paths: one charge path: three three-position switches: operating means arranged to concurrently actuate and correspondingly position said switches: conductors so arranged that, while said switches occupy any one of said three positions, each battery will be connected to a different one of said paths, and so that, by suitable actuation of said switches, said batteries and paths may be connected, each to any, respectively; said switches being so arranged relatively to said operating means and to one another that, during actuation thereof, such interconnections will be established, between different batteries and between different paths, as to avoid any interruption of the continuity of either of said discharge paths: and a circuit-breaker for said charge path opened by said operating means throughout such interconnections.

15. Three storage batteries: two discharge paths: one charge path: three three-position switches: operating means arranged to concurrently actuate and correspondingly position said switches: conductors so arranged that, while said switches occupy any one of said three positions, each battery will be connected to a different one of said paths, and so that, by suitable actuation of said switches, said batteries and paths may be connected, each to any, respectively; said switches being so arranged relatively to said operating means and to one another that, during actuation thereof, such interconnections will be established, between different batteries and between different paths, as to avoid any interruption of the continuity of either of said discharge paths: and an automatic underload circuit-breaker for said charge path, said breaker being opened by a member moved by said operating means whenever said switches are disposed intermediate to any two of the three positions thereof.

16. Three storage batteries: two discharge paths: one charge path: three three-position switches: operating means arranged to concurrently actuate and correspondingly position said switches: conductors so arranged that, while said switches occupy any one of said three positions, each battery will be connected to a different one of said paths, and so that, by suitable actuation of said switches, said batteries and paths may be connected, each to any, respectively; said switches being so arranged relatively to said operating means and to one another that, during actuation thereof, such interconnection will be established, between different batteries and between different paths, as to avoid any interruption of the continuity of either of said discharge paths: and an automatic underload circuit-breaker for said charge path, said breaker being opened by a member moved by said operating means throughout such interconnections.

17. Three storage batteries: two discharge paths: one charge path: three three-position switches: operating means arranged to concurrently actuate and correspondingly position said switches: conductors so arranged that, while said switches occupy any one of said three positions, each battery will be connected to a different one of said paths, and so that, by suitable actuation of said switches, said batteries and paths may be connected, each to any, respectively; said switches being so arranged relatively to said operating means and to one another that, during actuation thereof, such interconnections will be established, between different batteries and between different paths, as to avoid any interruption of the continuity of either of said discharge paths: and ratchet mechanism for assuring a predetermined sequence of current path connections to each battery.

18. Three storage batteries: two discharge paths: one charge path: three three-position switches: operating means arranged to concurrently actuate and correspondingly position said switches: conductors so arranged that, while said switches occupy any one of said three positions, each battery will be connected to a different one of said paths, and so that, by suitable actuation of said switches, said batteries and paths may be connected, each to any, respectively; said switches being so arranged relatively to said operating means and to one another that, during actuation thereof, such interconnections will be established, between different batteries and between different paths, as to avoid any interruption of the continuity of either of said discharge paths: and holding means for preventing the transfer of the connection of any battery from the charge path to a certain one of the discharge paths without first connecting such battery to the other of said discharge paths.

In witness whereof, I hereunto subscribe my name, this 9th day of February, 1920.

C. E. BEACH.